(12) United States Patent
Kawai et al.

(10) Patent No.: US 8,444,005 B2
(45) Date of Patent: May 21, 2013

(54) LID OPENING/CLOSING APPARATUS OF ELECTRONIC DEVICE

(75) Inventors: Yasutoshi Kawai, Moriguchi (JP); Takahiro Kitai, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 443 days.

(21) Appl. No.: 12/728,320

(22) Filed: Mar. 22, 2010

(65) Prior Publication Data

US 2010/0242367 A1 Sep. 30, 2010

(30) Foreign Application Priority Data

Mar. 24, 2009 (JP) ................................. 2009-071204

(51) Int. Cl.
*B65D 43/14* (2006.01)
(52) U.S. Cl.
USPC ............ 220/811; 220/812; 220/813; 220/323
(58) Field of Classification Search
USPC ................. 220/811, 812, 813, 814, 815, 816, 220/315, 323
See application file for complete search history.

(56) References Cited

U.S. PATENT DOCUMENTS

| | | | | |
|---|---|---|---|---|
| 3,432,967 A | * | 3/1969 | Horst | 220/326 |
| 3,508,482 A | * | 4/1970 | Taylor | 396/424 |
| 4,469,421 A | * | 9/1984 | Kamata | 396/415 |
| 5,796,464 A | * | 8/1998 | Zander | 396/536 |
| 6,151,453 A | * | 11/2000 | Ito | 396/176 |
| 6,157,788 A | * | 12/2000 | Sugita et al. | 396/539 |
| 2004/0214482 A1 | * | 10/2004 | Ariga | 439/894 |
| 2006/0188249 A1 | * | 8/2006 | Noguchi | 396/536 |
| 2007/0205208 A1 | * | 9/2007 | Ueda | 220/813 |

FOREIGN PATENT DOCUMENTS

| JP | 2002-284209 A | 10/2002 |
|---|---|---|
| JP | 2004-178948 A | 6/2004 |
| JP | 2007-59157 A | 3/2007 |

* cited by examiner

*Primary Examiner* — Anthony Stashick
*Assistant Examiner* — Christopher McKinley
(74) *Attorney, Agent, or Firm* — Westerman, Hattori, Daniels & Adrian, LLP

(57) ABSTRACT

In a lid opening/closing apparatus of an electronic device according to the present invention, a lid is supported on a housing through a slide type pivot mechanism, and can reciprocate among a fully closed position, a slide position, and a fully open position. The slide type pivot mechanism comprises: an axis part projecting from the base end part of the lid; an arm plate part formed on the housing; an engagement receiving part formed on the arm plate part and to be engaged with the axis part of the lid; a bearing part formed on the arm plate part and supporting the axis part of the lid rotatably; and a holding part formed on the housing, holding the axis part of the lid between the holding part and the arm plate part, and allowing the axis part to slide. The arm plate part is elastically deformable.

6 Claims, 7 Drawing Sheets

LID OPENING/CLOSING APPARATUS OF ELECTRONIC DEVICE

The application Number 2009-71204, upon which this patent application is based, is hereby incorporated by reference.

BACKGROUND OF THE INVENTION

1. Field of the Invention

The present invention relates to a lid opening/closing apparatus for supporting a lid covering a housing part for components such as a connector, battery or the like openably and closably in an electronic device such as a camera or the like.

2. Description of Related Art

Conventionally in electronic devices, as shown in FIGS. 12a, 12b and 12c, a lid 91 is supported on a surface of a housing 9 openably and closably, and the lid 91 can reciprocate among a fully closed position shown in FIG. 12a, a slide position where the lid 91 reaches by sliding along the surface of the housing 9 in one direction from the fully closed position as shown in FIG. 12b, and a fully open position where the lid 91 reaches by rotating around a base end part of the lid 91 in an opening direction from the slide position as shown in FIG. 12c.

Specifically, as shown in FIG. 12c, the lid 91 has an arm part 97 at the base end part thereof, axes 96, 96 project from both sides of the arm part 97, and the axes 96, 96 slidably engage grooves 95, 95 formed in the housing 9.

In the housing 9, a holding piece 94 projects near a component storage chamber 90, and the holding piece 94 holds an end part of the lid 91 while the lid 91 slides from the slide position to the fully closed position.

An engaging piece 93 projects from a rear surface of the lid 91 on a tip end side thereof, while an engagement receiving piece 92 to be engaged with the engaging piece 93 projects from an opening edge of the component storage chamber 90 of the housing 9, to lock the lid 91 at the fully closed position.

However, in the conventional lid opening/closing apparatus shown in FIGS. 12a, 12b and 12c, in the case of a wrong operation to slide the lid 91 in a half-open posture in a process of closing the lid 91 toward the fully closed position, the arm part 97 goes into a rear surface side of the housing 9 with the end part of the lid 91 being not engaged with the holding piece 94. Further, if a large operating force is applied to the lid 91 in the opening direction in this state, an excessive force acts on the lid 91 in the principle of leverage, resulting in a possible damage of the lid 91.

SUMMARY OF THE INVENTION

The present invention is to provide a lid opening/closing apparatus which reduces a possibility of damage of a lid even in the case of a wrong operation to slide the lid toward a fully closed position in a half-open posture.

In a lid opening/closing apparatus of an electronic device according to the present invention, a lid 2 is supported on a housing 1 through a slide type pivot mechanism 3 openably and closably. The lid 2 is capable of reciprocating among a fully closed position, a slide position where the lid 2 reaches by sliding along a surface of the housing 1 in one direction from the fully closed position, and a fully open position where the lid 2 reaches by rotating around a base end part of the lid 2 in an opening direction from the slide position. At the fully closed position, the lid 2 is locked to the housing 1 and prevented from rotating in the opening direction.

The slide type pivot mechanism 3 comprises:

an axis part 23 projecting from the base end part of the lid 2;

arm plate parts 6, 61 formed on the housing 1;

an engagement receiving part 64 which is formed on the arm plate parts 6, 61, and is to be engaged with the axis part 23 of the lid 2 at the fully closed position;

a bearing part 81 which is formed on the arm plate parts 6, 61, and is to support the axis part 23 of the lid 2 rotatably at the slide position; and a holding part which is formed on the housing 1, holds the axis part 23 of the lid 2 between the holding part and the arm plate parts 6, 61, and allows the axis part 23 to slide between the fully closed position and the slide position, the arm plate parts 6, 61 being elastically deformable between the engagement receiving part 64 and the bearing part 81 in a direction separating from the holding part.

In the lid opening/closing apparatus described above, at the fully open position of the lid 2, the axis part 23 of the lid 2 engages the bearing part 81 of the arm plate parts 6, 61 of the housing 1, allowing the lid 2 to rotate around the bearing part 81 in a closing direction.

When the lid 2 is rotated in the closing direction toward the slide position from this state, and the lid 2 is further slid from the slide position toward the fully closed position, the axis part 23 of the lid 2 escapes from the bearing part 81, and moves toward the engagement receiving part 64 while being held by the holding part. In a state where the axis part 23 of the lid 2 engages the engagement receiving part 64, the lid 2 is locked to the housing 1, and the lid 2 is prevented from rotating in the opening direction.

If a wrong operation to slide the lid 2 toward the fully closed position in a half-open posture in a process of closing the lid 2, the base end part of the lid 2 goes into a rear surface side of the housing 1. If a great operating force is further applied to the lid 2 in the opening direction in this state, a great force acts near the base end part of the lid 2 in the principle of leverage. However, a reaction force thereof is applied to the arm plate parts 6, 61 of the housing 1, and as a result, the arm plate parts 6, 61 are elastically deformed in a direction separating from the holding part, allowing the lid 2 to rotate (rotate reversely) in the opening direction.

In a particular configuration, the arm plate parts 6, 61 are made of synthetic resin, and are formed integrally with the housing 1. Since elasticity is thereby provided to the arm plate parts 6, 61, it is not necessary for the arm plate parts 6, 61 to be separate components made of metal or the like, reducing the number of components.

In another particular configuration, the arm plate parts 6, 61 project from a base plate part 4 which is integral with the housing 1, and tip ends of the arm plate parts 6, 61 are free ends. This provides sufficient elasticity to the arm plate parts 6, 61.

In another particular configuration, the axis part 23 of the lid 2 can rotate on the bearing part 81 while engaging the bearing part 81 of the arm plate parts 6, 61 and being held by the holding part, and pushes the arm plate parts 6, 61 in a process of moving from the bearing part 81 to the engagement receiving part 64 to elastically deform the arm plate parts 6, 61.

Therefore, when the axis part 23 of the lid 2 reaches the engagement receiving part 64, the arm plate parts 6, 61 elastically return and the engagement receiving part 64 engages the axis part 23 vigorously, making an operation feeling (click feeling) at the time of sliding the lid 2 to the fully closed position good.

In a further particular configuration, a locking receiving part is formed at an end part of the lid 2 on the axis part 23 side in order to lock the lid 2 to the housing 1 at the fully closed position, and a locking part for starting locking the locking receiving part is formed on the housing 1 immediately before reaching the fully closed position.

According to this particular configuration, the locking part for locking the lid 2 to the housing 1 at the fully closed position and the locking receiving part function near an elastically deformed part of the arm plate parts 6, 61 of the housing 1, even when the lid 2 receives action of an external force at the fully closed position, the arm plate parts 6, 61 are elastically deformed and the posture of the lid 2 does not become unstable.

As described above, with the lid opening/closing apparatus according to the present invention, even in the case of a wrong operation to slide the lid toward the fully closed position in a half-open posture in a process of closing the lid, a possibility of damage of the lid is reduced.

DETAILED DESCRIPTION OF THE PREFERRED EMBODIMENT

Figure 1:
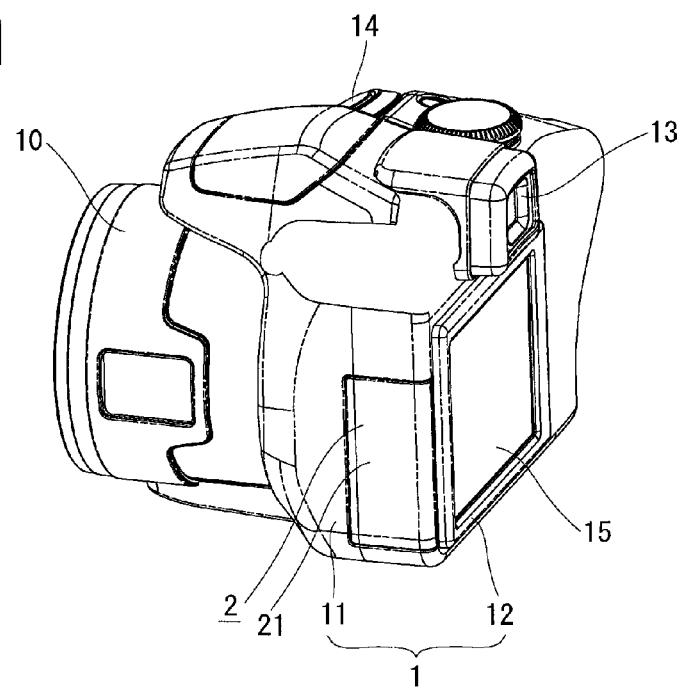
FIG. 1 is a perspective view showing an appearance of a camera which is an embodiment of the present invention.

In a preferred embodiment discussed in detail below with reference to drawings, the present invention is implemented in a digital camera. As shown in FIG. 1, the digital camera which is one embodiment of the present invention includes a housing 1 comprising a front cabinet 11 and a back cabinet 12 which are made of synthetic resin and joined together, and a lens-barrel 10 projects from the front cabinet 11. Also, a finder 13, a shutter button 14, and a display 15 are arranged in the housing 1.

Figure 2:
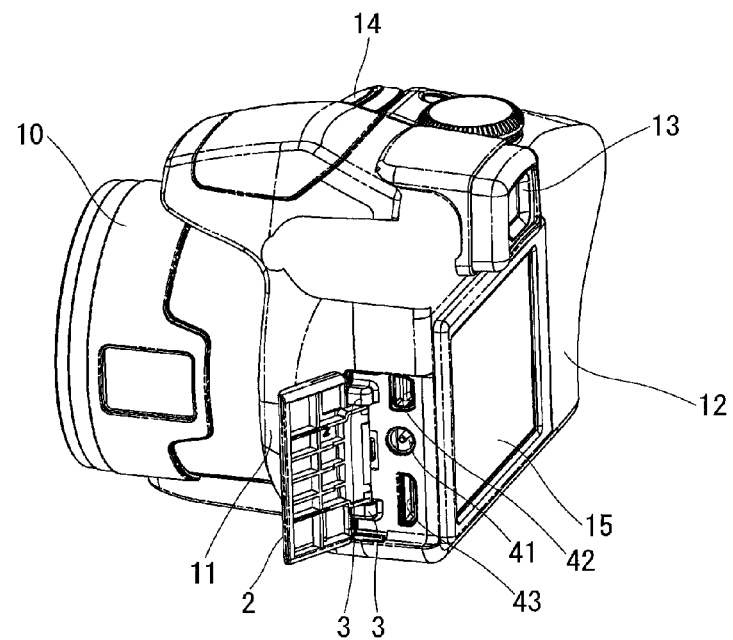
FIG. 2 is a perspective view of the camera with a lid thereof open.

Further, as shown in FIG. 2, a plurality of apertures 41, 42, 43 for connecting signal cables or the like to a connector are provided in the housing 1, and a lid 2 for covering these apertures 41, 42, 43 is attached to the housing 1 openably and closably via a slide type pivot mechanism 3. This slide type pivot mechanism 3 allows the lid 2 to reciprocate among a fully closed position shown in FIG. 6, a slide position shown in FIG. 7, and a fully open position shown in FIG. 9.

Figure 3:
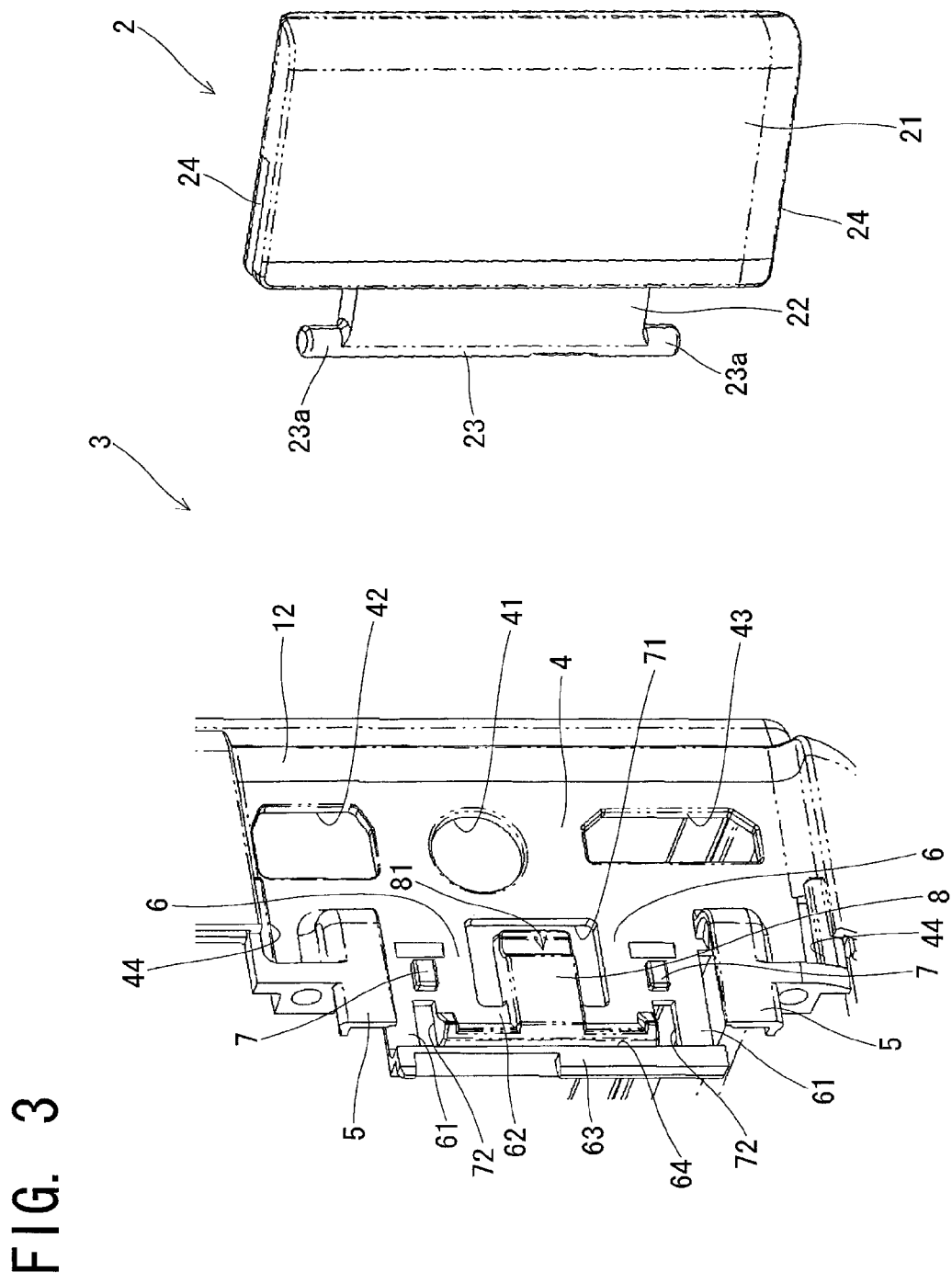
FIG. 3 is a perspective view of a slide type pivot mechanism with the lid detached from a housing.
Figure 4:
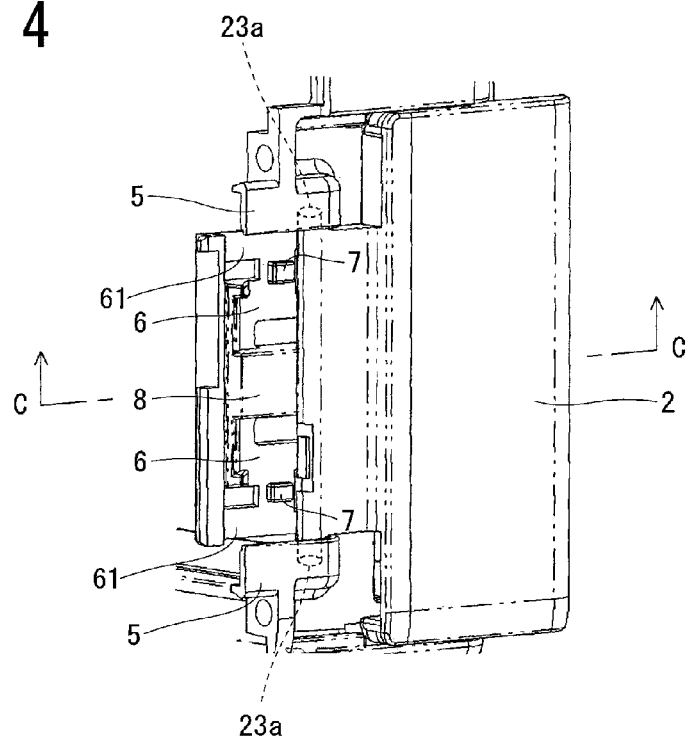
FIG. 4 is a perspective view of the slide type pivot mechanism with the lid attached to the housing.
Figure 5:
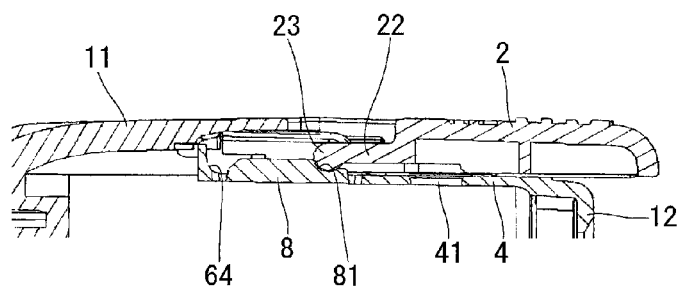
FIG. 5 is a cross-sectional view cut along a C-C line in FIG. 4.

FIGS. 3 to 5 show a particular configuration of the slide type pivot mechanism 3. As shown in FIG. 3, the lid 2 comprises a lid body part 21, an arm part 22 projecting from a base end part of the lid body part 21, and an axis part 23 projecting from a base end part of the arm part 22. Both end parts 23a, 23a of the axis part 23 projects outwardly from end surfaces of the arm part 22. Also, in side surfaces of the lid body part 21, grooves 24, 24 are provided at end parts on the axis part 23 side.

In contrast, a base plate part 4 having the apertures 41, 42, 43 described above is formed integrally with the back cabinet 12. Further, a pair of first arm plate parts 6, 6 projects from the base plate part 4, and a pair of second arm plate parts 61, 61 projects from an outside of the first arm plate parts 6, 6.

Tip end parts of the pair of first arm plate parts 6, 6 are coupled to each other by a first coupling part 62, and are free ends. Also, tip end parts of the pair of second arm plate parts 61, 61 are coupled to each other by a second coupling part 63, and are free ends. On a central part of the second coupling part 63, a tongue part 8 projects toward the base plate part 4.

Thus, a U-shaped first slit 71 opens around the tongue part 8, and a U-shaped second slit 72 opens around the first coupling part 62, thereby providing the first arm plate parts 6, 6 and the second arm plate parts 61, 61 with sufficient elastic deformation function.

As shown in FIG. 5, in tip end parts of the first arm plate parts 6, 6 and the second arm plate parts 61, 61, an engagement receiving part 64 to be engaged with the axis part 23 of the lid 2 at the fully closed position is provided in a recessed manner. Also, as shown in FIG. 3, in an end part of the tongue part 8 on the base plate part 4 side, a bearing part 81 for supporting the axis part 23 of the lid 2 rotatably at the slide position is provided in a recessed manner.

On surfaces of the first arm plate parts 6, 6, formed is a pair of projection parts 7, 7 having the same height as a surface of the tongue part 8. Also, on the back cabinet 12, on either side of the pair of second arm plate parts 61, 61, formed is a pair of pressing plate parts 5, 5 for holding both the end parts 23a, 23a of the axis part 23 of the lid 2 between the pressing plate parts 5, 5 and the second arm plate parts 61, 61, while allowing both the end parts 23a, 23a to slide.

Further, on the back cabinet 12, on either side of the first and second arm plate parts 6, 61, formed is a pair of protrusions 44, 44 to be engaged with a pair of grooves 24, 24 of the lid 2 in the process of slide of the lid 2 from the slide position to the fully closed position.

As shown in FIGS. 4 and 5, in a state where the axis part 23 of the lid 2 is supported by the bearing part 81 and both the end parts 23a, 23a of the axis part 23 are held by the pressing plate parts 5, 5, the lid 2 can rotate around the axis part 23.

In the process of pressing the lid 2 toward the fully closed position to slide the lid 2 along the housing 1 from this state, first, the axis part 23 of the lid 2 escapes from the bearing part 81, and runs on surfaces of the tongue portion 8 and the projection parts 7, 7. At this time, because both the end parts 23a, 23a of the axis part 23 of the lid 2 are pressed by the pressing plate parts 5, 5, the axis part 23 presses down the first arm plate parts 6, 6 and the second arm plate parts 61, 61, thereby elastically deforming the first arm plate parts 6, 6 and the second arm plate parts 61, 61 in a direction separating from the pressing plate parts 5, 5 slightly.

When the lid 2 is further pressed toward the fully closed position, the axis part 23 of the lid 2 engages the engagement receiving part 64. At this time, the first arm plate parts 6, 6 and the second arm plate parts 61, 61 elastically return and the engagement receiving part 64 comes to abut on the axis part 23 of the lid 2 vigorously. Therefore, at the time when the lid 2 was slid to the fully closed position, a good click feeling can be obtained.

Thus, the axis part 23 of the lid 2 and the arm part 22 go into a rear surface side of the front cabinet 11 at the fully closed position, and the lid 2 is closed with only the lid body part 21 being exposed as shown in FIG. 1.

Figure 6:
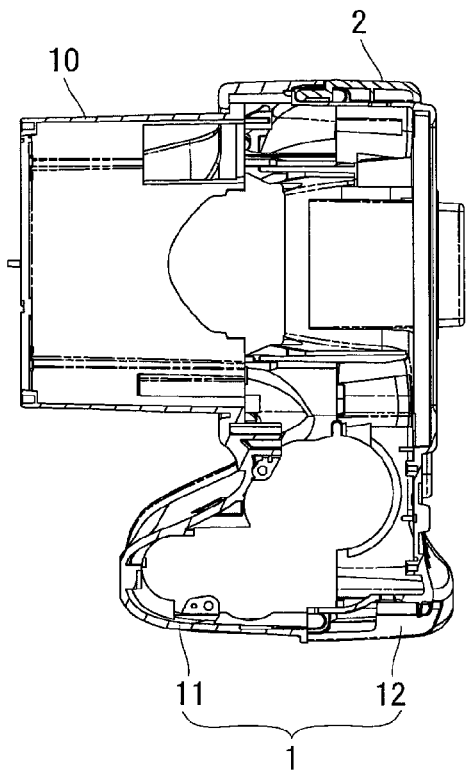
FIG. 6 is a cross-sectional view of the camera with the lid arranged at the fully closed position.
Figure 7:
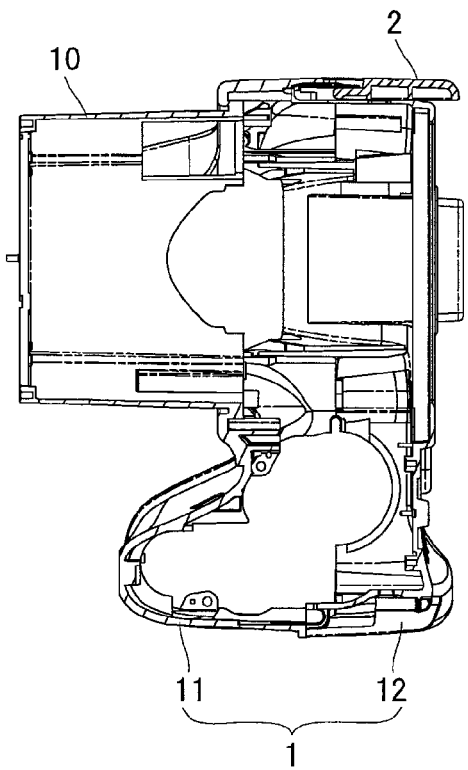
FIG. 7 is a cross-sectional view of the camera with the lid having slid to the slide position.

In the process of sliding the lid 2 from the fully closed position shown in FIG. 6 to the slide position shown in FIG. 7, the axis part 23 of the lid 2 first escapes from the engagement receiving part 64, and thereafter moves toward the bearing part 81 with the first arm plate parts 6, 6 and the second arm plate parts 61, 61 elastically deformed slightly. And then, the first arm plate parts 6, 6 and the second arm plate parts 61, 61 elastically return at the time when the axis part 23 of the lid 2 engages the bearing part 81, and therefore, a good click feeling can be obtained.

Figure 8:
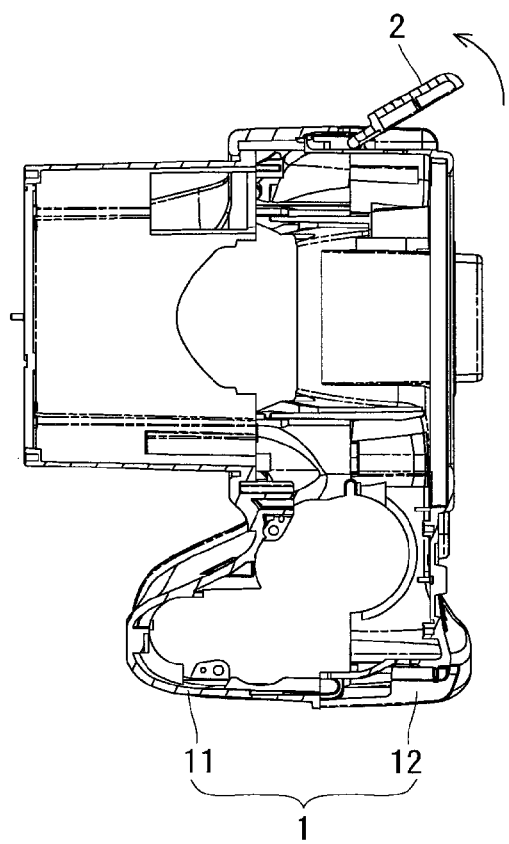
FIG. 8 is a cross-sectional view of the camera showing a process of rotation of the lid from the slide position to the fully open position.
Figure 9:
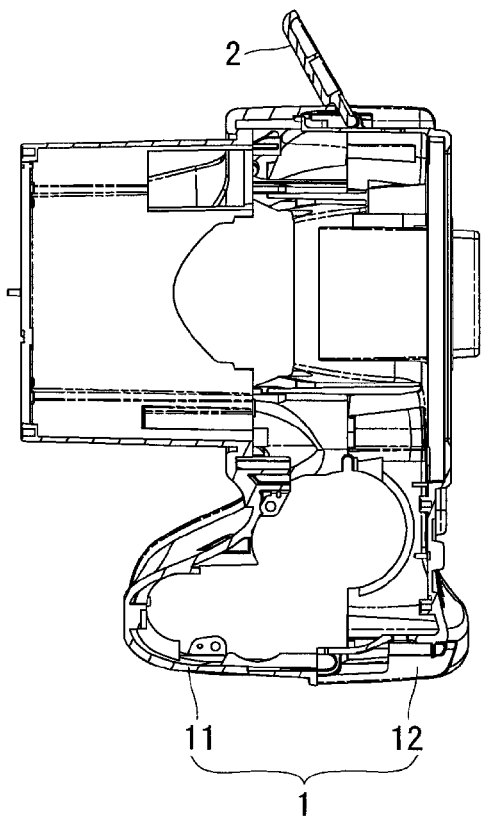
FIG. 9 is a cross-sectional view of the camera with the lid having rotated to the fully open position.

By rotating the lid 2 from the slide position shown in FIG. 7 through a half-open state shown in FIG. 8, to the fully open position shown in FIG. 9, the apertures 41, 42, 43 can be completely exposed as shown in FIG. 2. When closing the lid 2, the lid 2 is rotated from the fully open position shown in FIG. 9 through the half-open state shown in FIG. 8 to the slide position shown in FIG. 7, and thereafter, is slid to the fully closed position shown in FIG. 6.

Figure 10:
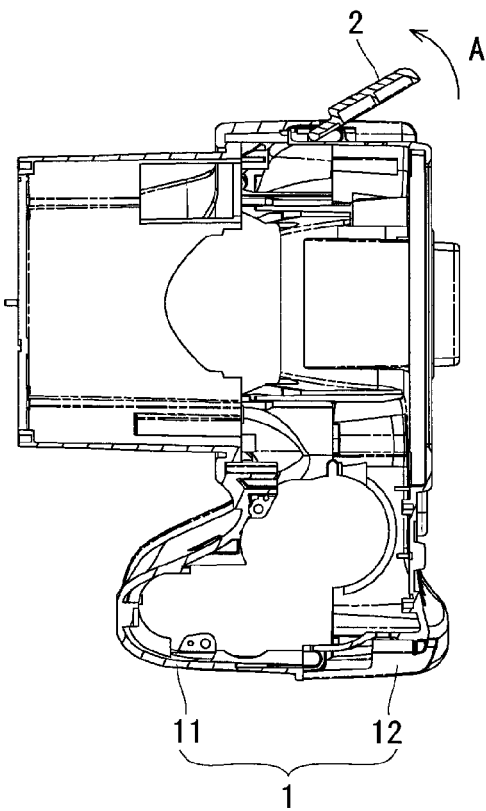
FIG. 10 is a cross-sectional view of the camera when an incorrect operation is conducted.
Figure 11:
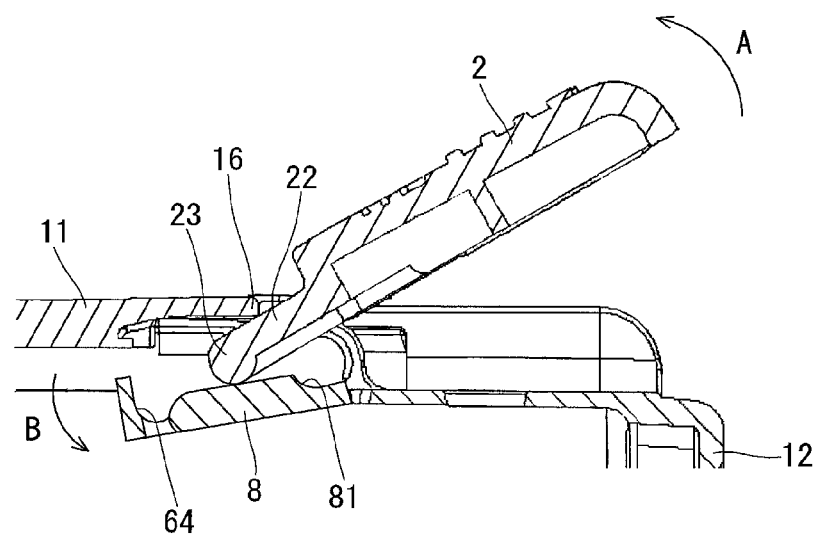
FIG. 11 is a cross-sectional view showing an important part in a state of FIG. 10 in an enlarged manner.
Figure 12A:
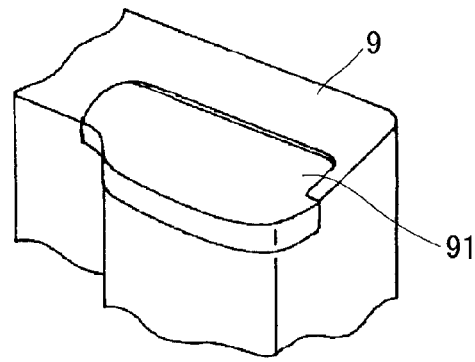
FIGS. 12a, 12b, and 12c are a series of perspective views showing a configuration and operation of a conventional lid opening/closing apparatus.
Figure 12B:
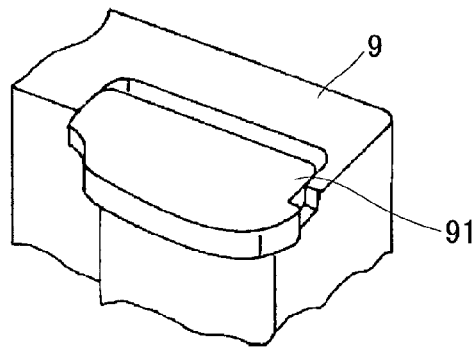
Figure 12C:
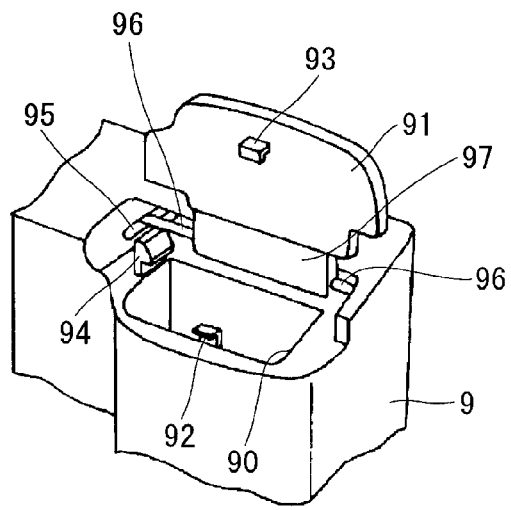

However, if a user performs operation to push the lid 2 into the housing 1 in the half-open state shown in FIG. 8, the axle portion 23 of the lid 2 and the arm part 22 go into the rear surface side of the front cabinet 11 with the grooves 24, 24 of the lid 2 and the protrusions 44, 44 of the back cabinet 12 not engaging each other, as shown in FIGS. 10 and 11.

In this state, if the user applies an excessive force to open the lid 2 as indicated by an arrow A shown in FIGS. 10 and 11, a surface of the arm part 22 of the lid 2 comes to abut on an end edge 16 of the front cabinet 11 to form a fulcrum of a lever, the axis part 23 of the lid 2 comes to abut on the surface of the first arm plate parts 6, 6 and the second arm plate parts 61, 61 to form a point of application of a lever. Therefore, a force for opening the lid 2 is amplified in the principle of leverage, a great force is applied to both the arms plate parts 6, 61 through the tongue part 8.

Here, the front cabinet 11 has relatively high rigidity, while the first arm plate parts 6, 6 and the second arm plate parts 61, 61 are elastically deformable easily. Therefore, the first arm plate parts 6, 6 and the second arm plate parts 61, 61 are elastically deformed as shown in FIG. 11. As a result, the lid 2 rotates (rotates reversely) in the opening direction around an abutting point (fulcrum) with the end edge 16 of the front cabinet 11, and reaches the fully open position shown in FIG. 9.

Therefore, with the camera described above, even if a user applies the excessive force to further open the lid 2 from the state shown in FIGS. 10 and 11, the first arm plate parts 6, 6 and the second arm plate parts 61, 61 are elastically deformed to allow the lid 2 to rotate reversely. Therefore, a possibility of damage of the lid 2 is reduced.

Also, at the fully closed position of the lid 2, the axis part 23 of the lid 2 engages the engagement receiving part 64 of the first arm plate parts 6, 6 and the second arm plate part 61, 61 which are elastically deformable easily. However, on both sides of the second arm plate parts 61, 61, the protrusions 44, 44 of the back cabinet 12 and the grooves 24, 24 of the lid 2 engage each other, and the lid 2 is maintained at the fully closed position. Therefore, even if an external force acts on the lid 2, the external force is received by the engagement between the protrusions 44, 44 of the back cabinet and the grooves 24, 24 of the lid 2, and the lid 2 maintains stable posture.

Also, since the first arm plate parts 6, 6 and the second arm plate parts 61, 61 are formed integrally with the housing made of synthetic resin, it is not necessary to use a separate component made of metal or the like in order to provide sufficient elasticity to the first arm plate parts 6, 6 and the second arm plate parts 61, 61, resulting in decrease in the number of components.

The present invention is not limited to the foregoing embodiment in construction but can be modified variously within the technical range set forth in the appended claims. Also, the present invention can be implemented in not only the digital camera, but also various electronic devices including a lid.

What is claimed is:

1. A lid opening/closing apparatus of an electronic device, comprising
    a lid supported on a housing of the electronic device; and
    a slide type pivot mechanism configured to open and close the lid the slide type pivot mechanism comprising:
    an arm part projecting from a base end part of the lid;
    an axis part projecting from a projecting end part of the arm part of the lid;
    an arm plate part formed on the housing;
    an engagement receiving part formed on the arm plate part and configured to engage the axis part of the lid at a fully closed position;
    a bearing part formed on the arm plate part and configured to support the axis part of the lid rotatably at a slide position; and
    a holding part formed on the housing, the holding part holds the arm part and the axis part of the lid between the holding part and the arm plate part, and configured to allow the arm part and the axis part to slide between the fully closed position and the slide position,
    wherein the arm plate part is elastically deformable between the engagement receiving part and the bearing part in a direction separating from the holding part,
    the lid is configured to reciprocate among the fully closed position, the slide position where the lid reaches by sliding along a surface of the housing from the fully closed position, and a fully open position where the lid reaches by rotating around the axis part in an opening direction from the slide position, and
    the lid is configured to lock to the housing to prevent the lid from rotating in the opening direction at the fully closed position.

2. The lid opening/closing apparatus according to claim 1, wherein the arm plate part is made of synthetic resin, and is formed integrally with the housing.

3. The lid opening/closing apparatus according to claim 1, wherein the arm plate part projects from a base plate part which is integral with the housing, and a tip end of the arm plate part is a free end.

4. The lid opening/closing apparatus according to claim 1, wherein the axis part of the lid is configured to rotate on the bearing part while engaging the bearing part of the arm plate part and being held by the holding part, and is configured to push the arm plate part in a process of moving from the bearing part to the engagement receiving part to elastically deform the arm plate part.

5. The lid opening/closing apparatus according to claim 1, wherein a locking receiving part is formed at an end part of the lid on the axis part side in order to lock the lid to the housing at the fully closed position, and a locking part for starting locking the locking receiving part is formed on the housing immediately before reaching the fully closed position.

6. The lid opening/closing apparatus according to claim 1, wherein the lid comprises:
the axis part;
an arm part projecting from the axis part; and
a lid body part projecting from the arm part, wherein
the axis part and the arm part are positioned in a rear surface side of the housing at the fully closed position.

* * * * *